US006810240B2

(12) United States Patent
Donig et al.
(10) Patent No.: US 6,810,240 B2
(45) Date of Patent: Oct. 26, 2004

(54) ANALOG MULTIPLIER

(75) Inventors: Günter Donig, Poing (DE); Josef Schmal, München (DE)

(73) Assignee: Infineon Technologies AG, Munich (DE)

(*) Notice: Subject to any disclaimer, the term of this patent is extended or adjusted under 35 U.S.C. 154(b) by 534 days.

(21) Appl. No.: 09/776,949

(22) Filed: Feb. 5, 2001

(65) Prior Publication Data

US 2001/0016481 A1 Aug. 23, 2001

(30) Foreign Application Priority Data

Feb. 4, 2000 (DE) .......................................... 100 04 995

(51) Int. Cl.[7] .............................. H04B 1/26; H04B 1/28

(52) U.S. Cl. ........................ 455/313; 455/333; 455/319; 455/326; 455/323; 327/355; 327/356

(58) Field of Search ................................. 455/333, 313, 455/318, 319, 323, 326; 330/296, 289, 200, 278, 282, 284; 327/113, 355, 356, 116, 119

(56) References Cited

U.S. PATENT DOCUMENTS

| | | | | | |
|---|---|---|---|---|---|
| 4,677,692 A | * | 6/1987 | Sakashita et al. | ........... | 455/319 |
| 5,523,717 A | * | 6/1996 | Kimura | ....................... | 330/252 |
| 5,532,637 A | * | 7/1996 | Khoury et al. | .............. | 327/359 |
| 5,557,228 A | | 9/1996 | Liu | ............................ | 327/355 |
| 5,809,410 A | * | 9/1998 | Stuebing et al. | ............ | 455/333 |
| 5,933,771 A | * | 8/1999 | Tiller et al. | ................. | 455/333 |
| 6,054,889 A | * | 4/2000 | Kobayashi | .................. | 327/357 |
| 6,100,731 A | * | 8/2000 | Otaka | ......................... | 327/119 |
| 6,157,822 A | * | 12/2000 | Bastani et al. | .............. | 455/323 |
| 6,205,325 B1 | * | 3/2001 | Groe | .......................... | 455/333 |
| 6,308,058 B1 | * | 10/2001 | Souetinov et al. | .......... | 455/326 |
| 6,329,864 B2 | * | 12/2001 | Suematsu et al. | ........... | 327/356 |

FOREIGN PATENT DOCUMENTS

EP 000434203 A2 * 6/1991 ............ H03D/7/14

OTHER PUBLICATIONS

Katsuji Kimura: "Some Circuit Design Techniques Using Two Cross–Coupled, Emitter–Coupled Pairs", IEEE Transactions on Circuits and Systems I: Fundamental Theory and Applications, vol. 41, May 1994, No. 5, pp. 411–423.

"Analysis and Design of Analog Integrated Circuits" Third Edition, (Gray et al.), dated 1993, pp. 667–681, as mentioned on p. 1 of the specification.

* cited by examiner

*Primary Examiner*—Duc M. Nguyen
(74) *Attorney, Agent, or Firm*—Laurence A. Greenberg; Werner H. Stemer; Ralph E. Locher

(57) ABSTRACT

The analog multiplier has a MOS input stage. This makes it possible to increase the linearity range of the multiplier. In a development, a cascode circuit having an additional pair of bipolar transistors is provided, which makes it possible to achieve a higher linearity without increasing the supply voltage. The analog multiplier is particularly suitable as a down-converter in a reception path of a mobile radio system.

6 Claims, 3 Drawing Sheets

ANALOG MULTIPLIER

BACKGROUND OF THE INVENTION

Field of the Invention

The invention lies in the field of circuit technology and relates, more specifically, to an analog multiplier circuit for the multiplication of two differential signals.

Analog multipliers multiply two differential signals together, with the result that the multiplied signal can be drawn off at the output of an analog multiplier. Analog multipliers are used in mobile radio applications, for example. In order to form the intermediate frequency, in the case of the GSM mobile radio standard, for example, the reception signal coupled into the antenna is preamplified and multiplied by a local oscillator signal in an analog multiplier or down-converter. As a result, a multiplied signal—the intermediate-frequency signal—is available at the output of the analog multiplier for further processing.

An analog multiplier of the generic type is known as a Gilbert cell or Gilbert multiplier cell and is described for example by Gray and Meyer in "Analysis and Design of Analog Integrated Circuits", third edition 1993, John Wiley and Sons, on pages 667–81. The Gilbert multiplier circuit is constructed from bipolar npn transistors. An emitter-coupled transistor pair is connected in series with two cross-coupled, emitter-coupled transistor pairs. The Gilbert cell allows the multiplication of two differential signals, whereby four-quadrant multiplication is possible. The Gilbert cell described has the disadvantage that it has only a very small linear range. The DC transfer characteristic of the Gilbert cell is the production of the hyperbolic tangent functions of the two differential input voltages. However, the hyperbolic tangent function is linear only for small arguments, that is to say small differential voltage values. It is only in the linear range, however, that the differential voltage signals are processed further in a manner free from distortion by the multiplier.

Mobile radio systems are increasingly being used in motor vehicles. In the case of car telephones, for example, in whose reception path analog multipliers are used as down-converters, there is a requirement for a higher linearity or a greater linearity range of the mixer.

SUMMARY OF THE INVENTION

The object of the present invention is to provide an analog multiplier which overcomes the above-noted deficiencies and disadvantages of the prior art devices and methods of this general kind, and which provides for higher linearity.

With the above and other objects in view there is provided, in accordance with the invention, an analog multiplier, comprising:

two first transistors having gates connected to one another, the first transistors being MOS transistors enabled to receive a first differential signal;

two second, emitter-coupled transistors;

two third, emitter-coupled transistors cross-coupled with the two second transistors;

one of the first transistors being connected in series with the two second transistors and another of the first transistors being connected in series with the two third transistors;

the two second and the two third transistors being configured to receive a second differential signal and to output a third differential signal as an output signal thereof.

In other words, two first transistors are MOS transistors whose gates are connected to one another. The MOS transistors are used as input stage in order to increase the linearity range of the analog multiplier.

In other words, the analog multiplier has two first transistors, which are connected to one another and to which a first differential signal to be multiplied can be fed. A respective emitter-coupled transistor pair is connected in series with the two first transistors, in each case two second transistors whose emitters are connected to one another and two third transistors whose emitters are connected forming a transistor pair. These transistor pairs are cross-coupled to one another. A second differential signal to be multiplied can be fed to the base terminals of the second and third transistors. The multiplied signal can be picked off at the collector terminals of the second and third transistors. The above-described circuit for forming an analog multiplier has the advantage of a higher linearity or a greater linear range.

In accordance with an added feature of the invention, the MOS transistors are connected to ground via respective resistors.

In accordance with an additional feature of the invention, a capacitor is connected between the gates of the MOS transistors and ground. A bias voltage can be set at this point.

In accordance with another feature of the invention, a cascode circuit is formed as follows: fourth transistors are respectively connected in series between one of the first transistors and the two second transistors and between the other of the first transistors and the two third transistors. This configuration has the advantage of combining the higher linearity with a low supply voltage.

In accordance with a further feature of the invention, the fourth transistors are connected to one another at a node, and a second capacitor is connected between the node and ground. A second bias voltage can be fed in at this node.

MOS transistors have parasitic capacitances between drain and source, and between gate and drain. At high frequencies, the path from the emitter nodes of the second transistors and from the emitter nodes of the third transistors to ground acquires a relatively low impedance if the fourth transistors are not used. The second differential signal which can be applied to the multiplier circuit generates, at the emitter nodes of the second and third transistors, as a result of a rectification operation at the base-emitter diodes of the second and third transistors, a common-mode voltage signal at twice the frequency of the second differential signal that can be fed in. This common-mode voltage signal generates a common-mode current signal since low-impedance paths are formed by the MOS transistors effected by parasitic capacitances. This common-mode current signal in turn generates a common-mode voltage signal at the output of the circuit, across a load resistor that can be connected, said common-mode voltage signal having a high signal amplitude if the load resistor is large. The high common-mode voltage signal is superposed on the useful signal at the output, that is to say on the third differential signal which can be picked off at the second and third transistors. The result is that the useful signal output level of the multiplier circuit already attains limitation before the actual linearity limit. An increase in the supply voltage reduces the limitation of the useful signal level at the output of the multiplier. The insertion of fourth transistors into the circuit prevents low-impedance paths from being formed, and, consequently, this circuit has not only the advantage of higher linearity but also the advantage of the low supply voltage. This is because, due to the dictates of the system, an increase in the supply voltage is often impossible or undesirable.

In accordance with an concomitant feature of the invention, the analog multiplier as summarized in the foregoing is provided in combination with a mobile radio system; the first differential signal is a reception signal, the second differential signal is generated by a local oscillator, and the third differential signal is an intermediate-frequency signal further utilized in the mobile radio system.

Other features which are considered as characteristic for the invention are set forth in the appended claims.

Although the invention is illustrated and described herein as embodied in an analog multiplier, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

Figure 1:
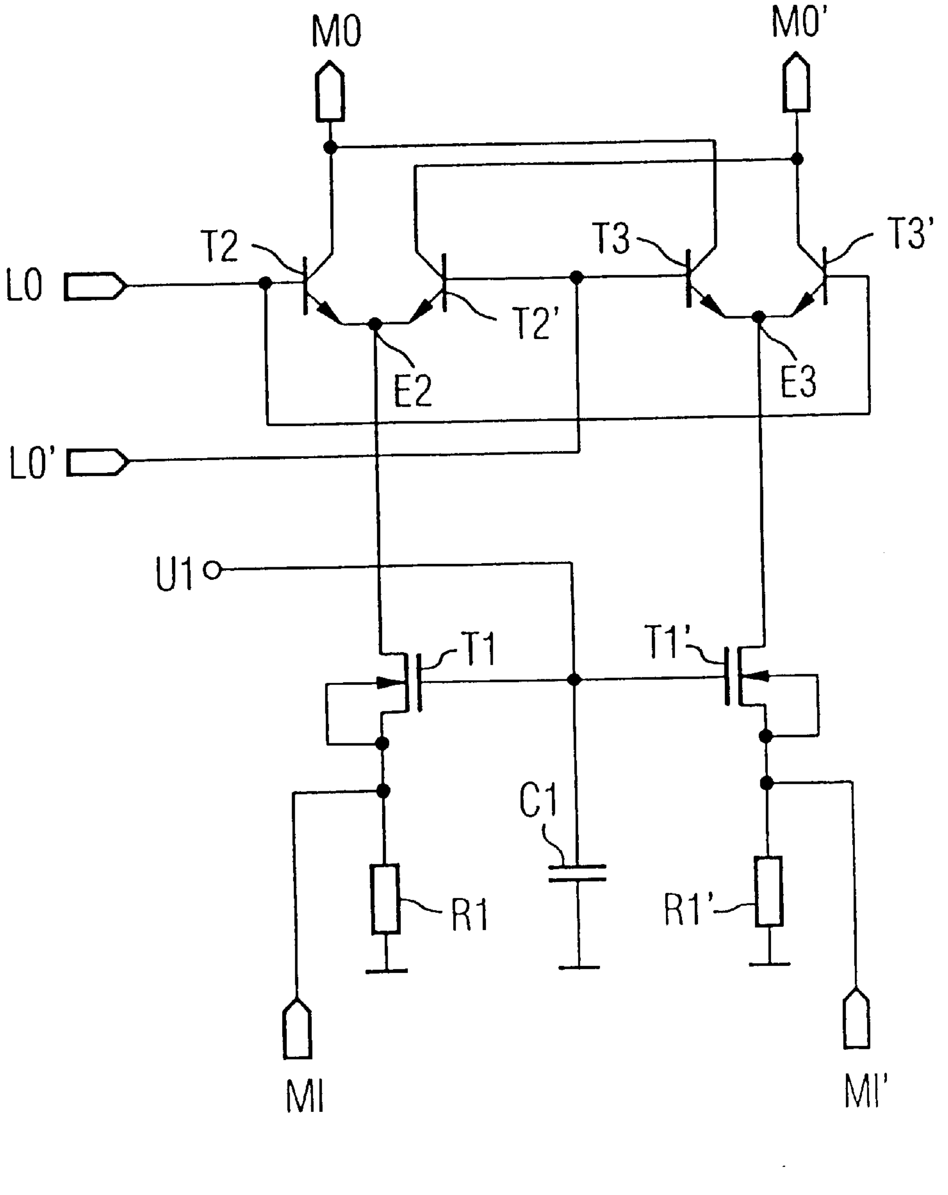
FIG. 1 is a schematic diagram of a first embodiment of the analog multiplier according to the invention.

Referring now to the figures of the drawing in detail and first, particularly, to FIG. 1 thereof, there is seen a first embodiment of an analog multiplier having a MOS input stage. The input stage has two first transistors T1, T1' using MOS technology. The gates of the first transistors are connected to one another. The source terminals of the transistors are connected to ground via a respective resistor R1, R1'. The connected gates of the transistors T1, T1' are connected to ground via a capacitor C1. A first differential signal MI, MI' can be fed to the source terminals of the first transistors T1, T1', which are connected to the substrate. A bias voltage U1 can be applied across the capacitor C1 and to the gate of the first transistors T1, T1'. The drain terminals of the first transistors T1, T1' are each connected to the emitter terminals of an emitter-coupled transistor pair T2, T2' and T3, T3', respectively. In this case, two second transistors T2, T2' and two third transistors T3, T3' form a respective transistor pair. The emitters of the two second transistors T2, T2' are connected at a node E2, and the emitter terminals of the two third transistors T3, T3' are connected at a node E3. The two transistor pairs formed by the second and third transistors are cross-coupled. For this purpose, the base terminals of the two adjacent transistors T2', T3 are connected, as are the base terminals of the transistors T2, T3'. A second differential signal LO, LO' can be fed to the base terminals. The collector terminals of the transistors T2, T3 and T2', T3' are connected to one another. The multiplied signal can be drawn off as third differential signal at the collector terminals of these two transistor pairs. The use of a MOS input stage leads to an advantageous, greater linearity range of the multiplier circuit.

Figure 2:
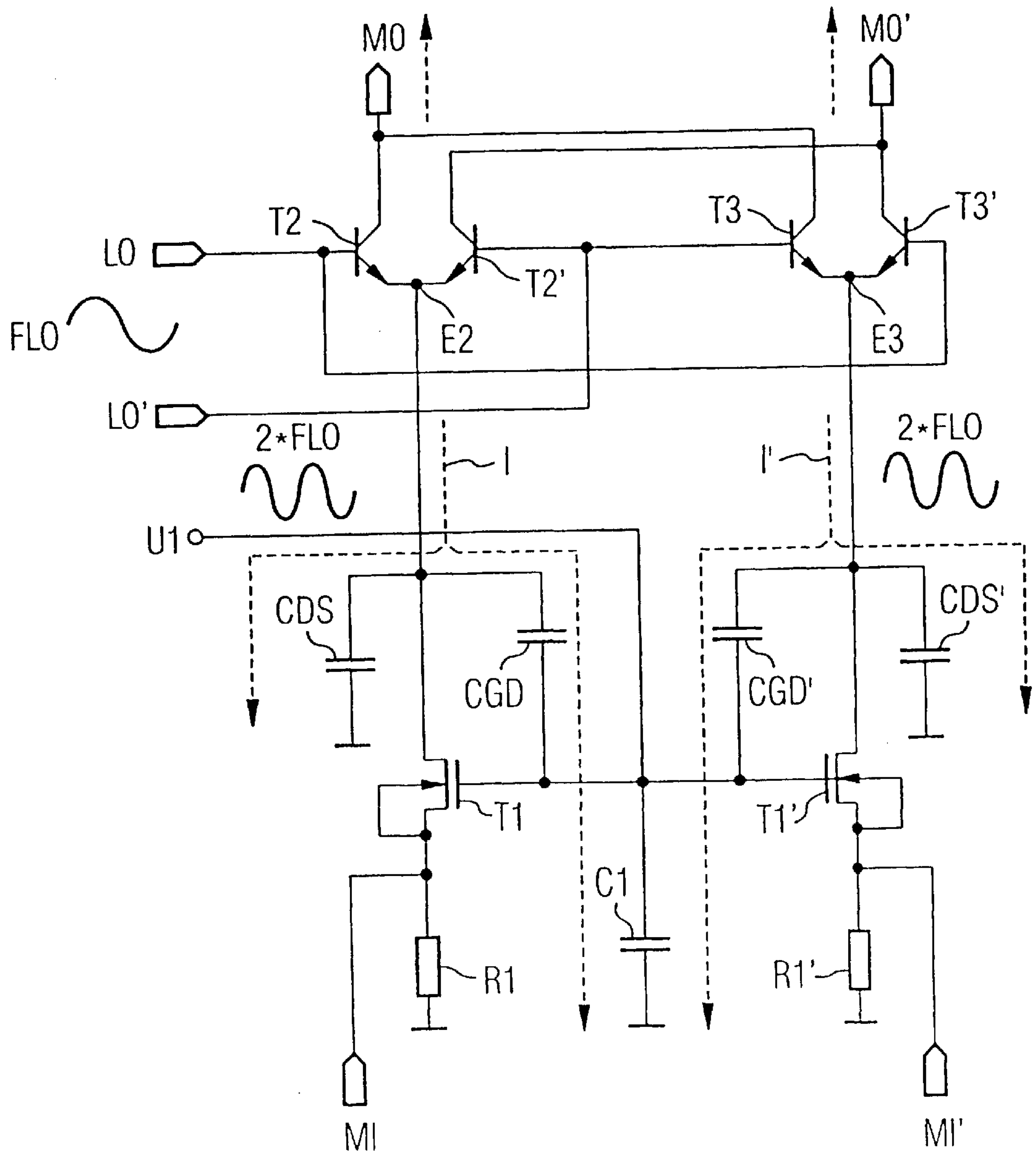
FIG. 2 is a schematic diagram of the exemplary embodiment illustrated in FIG. 1, portraying the parasitic capacitances of the MOS transistors.

Compared with bipolar transistors, MOS transistors have larger parasitic capacitances, in particular between gate and drain and between drain and substrate. These capacitances of the MOS transistors are also referred to as reverse transfer capacitance and output capacitance. At high frequencies, a relatively low-impedance path is produced in each case between the emitter nodes E2 and E3 to ground. During operation of the analog multiplier, this can have the effect that the frequency FLO of the signal that can be fed in at the second differential signal input LO, LO' can be measured, as a result of a rectification operation at the base-emitter diodes of the second and third transistors T2, T2', T3, T3', as a common-mode voltage signal at twice the frequency (two times FLO) at the emitter nodes E2, E3. For illustration purposes, FIG. 2 shows the circuit configuration with the parasitic capacitances CDS, CDS', CGD, CGD' portrayed, and also with the common-mode currents, I, I' at the frequency two times FLO, caused thereby. If a high load resistor is connected to the output of the analog multiplier, that is to say to the collector terminals of the second and third transistors, then the common-mode current signal at the output is converted into a common-mode voltage signal having a high signal amplitude. This high common-mode voltage signal, which is superposed on the useful signal that can be picked off at the terminals MO, MO' of the analog multiplier circuit, has the effect that the supply voltage of the circuit configuration must be increased in order to prevent the level of the useful signal at the output of the multiplier from already being driven to limitation before the actual linearity limit.

Figure 3:
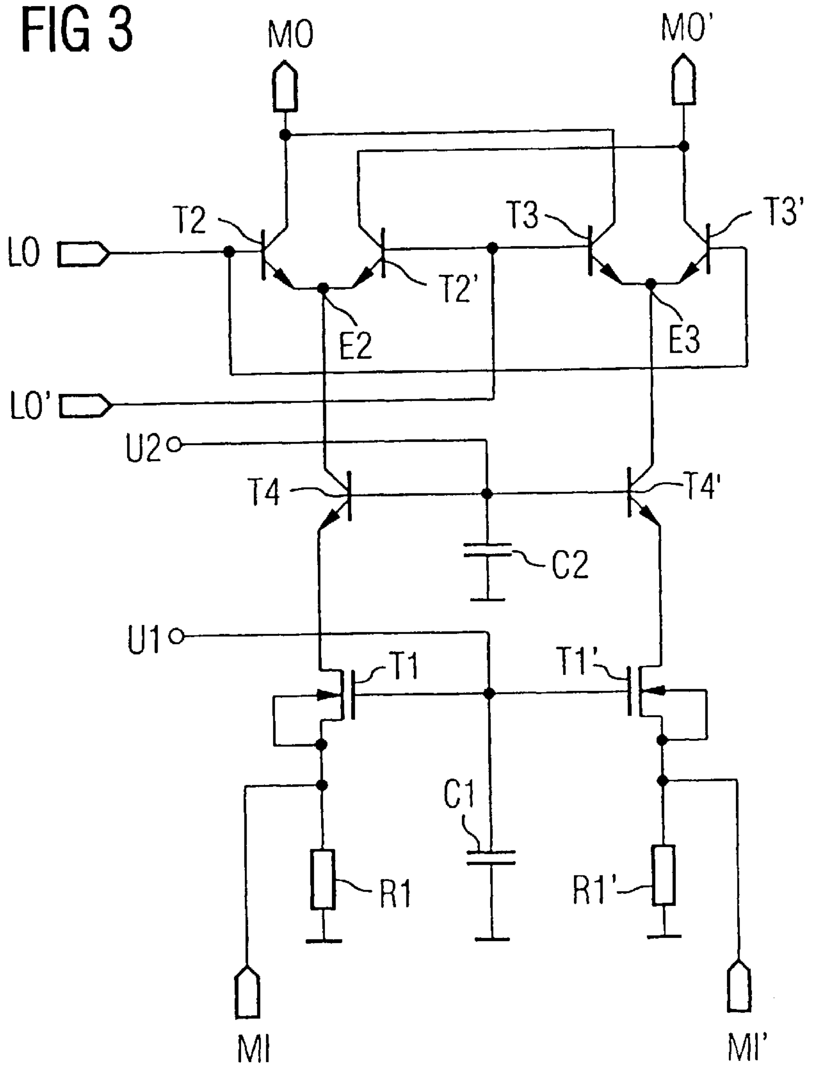
FIG. 3 is a schematic diagram of a development of the exemplary embodiment illustrated in FIG. 1.

Referring now to FIG. 3, there is shown a second exemplary embodiment of the present invention, in which the increased linearity range is achieved without increasing the supply voltage. Bipolar transistors have significantly lower parasitic capacitances than MOS transistors. For this reason, additional bipolar transistors T4, T4' are connected between the emitter nodes E2, E3 and the drain terminals of the first transistors T1, T1'. In this case, the respective collector terminal of the transistors T4, T4' is connected to a respective emitter node E2, E3, and the emitter terminals of the fourth transistors T4, T4' are connected to the drain terminals of the first transistors T1, T1'. The base terminals of the fourth transistors T4, T4' are connected to one another at a node to which a capacitor C2 is connected. The other terminal of the capacitor is connected to ground. A second bias voltage U2 can be applied across this capacitor C2. As a result of the serial insertion of additional, fourth transistors T4, T4' with the formation of a cascode stage, the paths from the emitter points E2, E3 via the first transistors T1, T1' to ground do not acquire a low impedance even at high frequencies. The generation of a common-mode signal having twice the frequency of the signal which can be fed in at the second differential signal input of the circuit is greatly suppressed by this means. Consequently, there is no superposition of a common-mode signal with the useful signal at the output MO, MO' of the multiplier circuit. Therefore, it is possible to dispense with increasing the supply voltage. Consequently, the circuit of an analog multiplier in accordance with FIG. 3 has the advantage that a multiplier with increased linearity can also be used in those systems which, due to the dictates of the system, do not allow an increase in the supply voltage.

Figure 4:
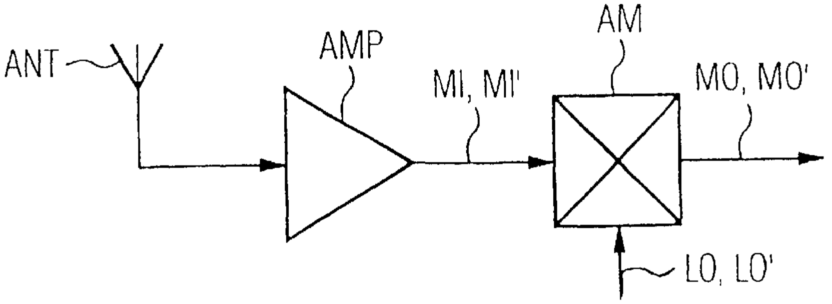
FIG. 4 is a block diagram of an exemplary application for the invention as a down-converter in a reception path of a mobile radio system.

Referring now, finally, to FIG. 4, there is shown an exemplary application for the above-described analog multiplier circuit AM in the receiver path of a mobile radio system. In this case, a reception signal coupled in at an antenna ANT is preamplified in a low-noise preamplifier AMP and fed to a down-converter, which is designed as an analog multiplier AM, to a first differential signal input MI, MI' thereof. The second differential signal input of the analog multiplier AM is connected to a local oscillator at the inputs LO, LO'. The multiplied signal is available at the outputs MO, MO' of the analog multiplier. In reception paths of a mobile radio system, this output signal is the intermediate-frequency signal.

The increased linearity range of an analog multiplier now allows a circuit arrangement in accordance with FIG. 4 to be used, in an advantageous manner, for example in motor vehicle mobile radio systems.

We claim:

1. An analog multiplier, comprising:

two first transistors having gates connected to one another, said first transistors being MOS transistors enabled to receive a first differential signal;

two second, emitter-coupled transistors;

two third, emitter-coupled transistors cross-coupled with said two second transistors;

one of said first transistors being connected in series with said two second transistors and another of said first transistors being connected in series with said two third transistors;

said two second and said two third transistors being configured to receive a second differential signal and to output a third differential signal as an output signal thereof.

2. The analog multiplier according to claim 1, wherein said MOS transistors are connected to ground via respective resistors.

3. The analog multiplier according to claim 1, which comprises a capacitor connecting said gates of said MOS transistors to ground.

4. The analog multiplier according to claim 1, which comprises fourth transistors respectively connected in series between one of said first transistors and said two second transistors and between the other of said first transistors and said two third transistors, for forming a cascode circuit.

5. The analog multiplier according to claim 4, wherein said fourth transistors are connected to one another at a node, and a second capacitor is connected between said node and ground.

6. In combination with a mobile radio system, the analog multiplier according to claim 1, wherein the first differential signal is a reception signal, the second differential signal is generated by a local oscillator, and the third differential signal is an intermediate-frequency signal.

* * * * *